United States Patent

Wada

[15] 3,638,955

[45] Feb. 1, 1972

[54] CASSETTE TAPE RECORDER

[72] Inventor: Eiichi Wada, Yokohama-shi, Japan

[73] Assignee: Pioneer Electronic Corporation, Tokyo, Japan

[22] Filed: Oct. 7, 1969

[21] Appl. No.: 864,431

[30] Foreign Application Priority Data

Oct. 8, 1968 Japan ................................ 43/87851

[52] U.S. Cl. ..............................274/4 C, 33/128, 116/114, 179/100.2 Z, 242/197, 352/172

[51] Int. Cl. ......................................................G11b 5/78

[58] Field of Search ..................274/4 E, 4 C, 11 C; 242/198, 242/199, 200; 179/100.2 Z; 352/172; 240/2.1; 353/40, 41; 33/128, 172 F

[56] References Cited

UNITED STATES PATENTS

| | | | |
|---|---|---|---|
| 1,283,256 | 10/1918 | Miller | 356/171 |
| 2,937,818 | 5/1960 | Zorn | 242/199 |
| 2,988,295 | 6/1961 | Loewe | 242/199 |
| 3,439,919 | 4/1969 | Laa | 274/4 E |

FOREIGN PATENTS OR APPLICATIONS

| | | | |
|---|---|---|---|
| 643,556 | 6/1962 | Canada | 33/128 |

*Primary Examiner*—Leonard Forman
*Assistant Examiner*—Dennis A. Dearing
*Attorney*—Sughrue, Rothwell, Mion, Zinn & Macpeak

[57] ABSTRACT

A tape recorder includes a light source disposed below a cassette for illuminating the tape occupying the takeup and return spools through a hole in the cassette wall and reflects the image toward a recorder viewing opening coplanar with the visible outer edge of the cassette.

1 Claims, 3 Drawing Figures

PATENTED FEB 1 1972 3,638,955

INVENTOR
EIICHI WADA

BY Sughrue, Rothwell, Mion,
Zinn & Macpeak
ATTORNEYS

CASSETTE TAPE RECORDER

BACKGROUND OF THE INVENTION

1. Field of the Invention

The present invention relates to a cassette tape recorder and in particular to a cassette tape recorder in which the degree of tape takeup is easily indicated optically allow use in a car.

2. Description of the Prior Art

Cassette tape recorders are in general use. These tape recorders are constructed so that recording and reproduction are performed by automatic movement of a tape in a cassette with the tape wound from one reel to the other reel. In this case, in order to enable a direct view of the degree of tape takeup of one reel, a window for direct viewing has been provided within the upper surface in the usual cassette. Namely, if FIG. 1 is referred to for explanation, a cassette 1 has a window 2 in the upper surface for direct viewing of a tape takeup. A similar window is provided at the corresponding position of the bottom surface as well, but it is not shown. Holes 3 and 4 allow the reel driving shafts to pierce the cassette. A tape 5 is provided in such a manner as to move from one reel to the other (not shown) and has an exposed surface which engages with a transducer head when the cassette is positioned within the recorder mechanism. As shown in FIG. 1, the degree of tape takeup on left and right reels can be viewed directly from the window 2. In a usual portable cassette tape recorder, the window is exposed to the outside and thereby it is easily possible to view the same directly. However, when a cassette must be put in a narrow space for instance in a tape recorder for a car, the upper or lower surface of the cassette is enclosed in a case and hence is not exposed when the cassette is inserted in the mechanism of the recorder by moving it in the direction of arrow 6. Consequently, while the direct-view window is provided, it is of no use and an operator cannot see the progressive degrees accumulation and depletion of tape during play. For this reason, operation is inconvenient and the provision of an apparatus enabling easy direct viewing of the degree of tape takeup is desired for a tape recorder having an enclosed direct-view window for use in a car and the like. An object of the present invention is to provide an improved cassette tape recorder which is able to satisfy the above desire.

SUMMARY OF THE INVENTION

A cassette tape recorder includes a cassette with windows for direct viewing of the degree of tape takeup on an upper surface. A light source is arranged to project light to said window when said cassette is inserted into a recorder. A prism plate with a reflecting surface reflects light from said light source, after passing through both windows of said cassette, thereby allowing optical reading of the degree of tape takeup in said cassette after charging said cassette in said recorder wherein said direct-view windows cannot be seen directly.

As in the present invention, a customary cassette can be used without any modification necessary, the invention has broad application to existing tape systems.

DESCRIPTION OF THE PREFERRED EMBODIMENT

Figure 1:
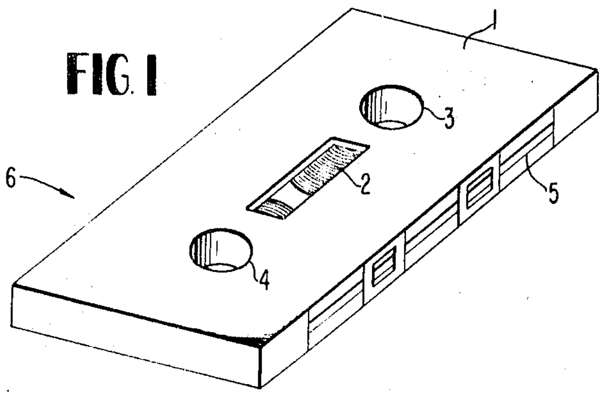
FIG. 1 is a perspective view of a usual cassette.
Figure 2:
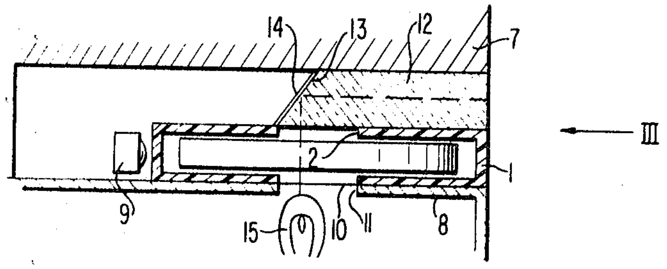
FIG. 2 is a schematic sectional view of an embodiment of the present invention.

In FIG. 2, for instance, plate 7 such as a dashboard in front of the driver's set of car carries the tape recorder mechanism, within the same. A frame 8 guides a cassette 1 as shown in FIG. 1 into tape recorder mechanism and the cassette 1 is inserted in the direction of arrow 6 of FIG. 1. A transducer head 9 forms a portion of the mechanism and contacts an exposed surface of a tape 5 and performs recording, reproducing, erasing or the like. There is designated a lower window 10, corresponding to upper window 2 of the cassette 1. A hole 11 corresponding to the lower window 10 is pierced within the frame 8. At the upper surface of the cassette 1 there is provided a prism plate 12, according to the present invention. Varnish 14 is coated on an inclined surface 13 of said prism plate 12 in order to make it a reflecting surface. The prism plate 12 is arranged so that the inclined surface 13 is located just above the windows 2 and 10. According to circumstances, the prism plate 12 can be used as an upper guide frame of the cassette. A light source 15 is provided beneath hole 11 of the frame 8. Light from the light source 15 is guided along the direction of the dotted arrow of FIG. 2 by painting the whole of upper surface and the lower surface except for the portion corresponding to the hole, black.

Figure 3:
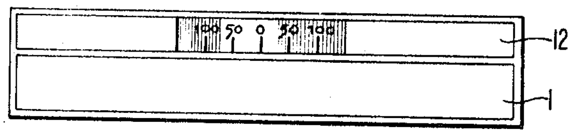
FIG. 3 is a side view from a direction of a arrow III OF FIG. 2. The same members in all Figures are designated by the same numbers.

FIG. 3 is a side view from a direction of arrow mark III of FIG. 2 and the prism plate 12 is shown as graduated.

In the present invention of the above construction, after inserting the cassette 1 in the mechanism of tape recorder, the upper and lower surfaces of windows 2, 10 for direct viewing of the degrees of takeup are enclosed and only the side of the cassette can be seen as shown in FIG. 3. Then, according to the present invention, the movement or degree of tape takeup can be directly seen optically from the direction of arrow mark III of FIG. 2 by light from the light source 15 reflected by the reflecting surface 13 of the prism plate 12. It is possible to read easily the degree of takeup of the tape by the graduations on the visible face of the prism plate 12. Consequently, for instance, if the tape recorder of the present invention is used in a car, a driver can operate easily the tape recorder and take pleasure in a musical performance by tape. As above, according to the present invention it is unnecessary to use any complicated, expensive apparatus and it is possible to know easily the degrees of takeup tape within a tape recorder in which a conventional cassette is used where windows for direct viewing of tape are obscured. Furthermore, it is possible to read the degrees optically with ease in a dark place. Moreover, according to the present invention, in inserting the cassette, the hole for inserting the cassette is illuminated by the light source 15 and it is thereby possible to change cassette certainly and swiftly in the dark. Besides, during performance the prism plate 12 illuminates fantastically and increases the beauty. In particular the cassette tape recorder is suitable for reproduction of music. Besides, in the present invention it is possible to make the front of prism plate inclined inside slightly and thereby allowing easy reading from above. Besides, it is possible to make the viewing face of prism into any shape and it is possible to obtain cinemascopic effects by bending the face of prism allowing viewing in the direction of FIG. 3, that is from the front or from the side.

What is claimed is:

1. In a cassette tape recorder having a rectangular opening within one sidewall for inserting said cassette until the visible cassette's sidewall lies flush with the recorder sidewall to effect operation of said recorder and wherein said cassette has aligned windows on the top and bottom thereof for direct viewing of the degree of tape takeup within the cassette, the improvement comprising:

a light source carried by said recorder adjacent one window to project light through said windows when said cassette is inserted within said recorder, and a light-transmitting prism within said recorder overlying said cassette and having a display surface flush with said visible cassette sidewall and said recorder sidewall and a reflecting surface inwardly from said display surface positioned to reflect light passing through said windows towards said prism display surface, said light-transmitting prism being opaquely coated except for the portion directly overlying said cassette window and the display surface opposite that of said reflecting surface and further, wherein said display surface carries graduation lines indicative of the degree of tape takeup, whereby the optical reading of the degree of tape takeup is displayed even when said windows cannot be seen directly upon insertion of said cassette within said recorder opening.

* * * * *